United States Patent
Rosenbaum et al.

(10) Patent No.: US 6,886,360 B1
(45) Date of Patent: May 3, 2005

(54) PORTABLE AIR CONDITIONER AND LIQUID CONTAINER

(75) Inventors: Thomas M. Rosenbaum, Scottsdale, AZ (US); Ronald N. Shostack, Beverly Hills, CA (US); Raymond S. Zuckerman, Scottsdale, AZ (US); Bryan R. Falk, Chandler, AZ (US)

(73) Assignee: Coolwell LLC., Los Angeles, CA (US)

( * ) Notice: Subject to any disclaimer, the term of this patent is extended or adjusted under 35 U.S.C. 154(b) by 35 days.

(21) Appl. No.: 10/775,915

(22) Filed: Feb. 9, 2004

(51) Int. Cl.$^7$ ............................................. F25D 3/02
(52) U.S. Cl. ........................... 62/424; 62/406; 62/426; 62/457.7
(58) Field of Search ..................... 62/406, 424, 426, 62/434, 457.7, 457.9

(56) References Cited

U.S. PATENT DOCUMENTS

| | | |
|---|---|---|
| 768,622 A | 8/1904 | Peacock |
| 774,811 A | 11/1904 | Witter |
| 1,196,169 A | 8/1916 | Stillman |
| 1,782,612 A | 11/1930 | Hardin |
| 1,902,246 A | 3/1933 | Kitchen |
| 1,922,790 A | 8/1933 | Alger |
| 1,952,414 A | 3/1934 | Brizzolara .................. 62/133 |
| 2,060,482 A | 11/1936 | Ballman ..................... 62/131 |
| 2,093,853 A | 9/1937 | Snavely ...................... 62/131 |
| 2,118,044 A | 5/1938 | Gudmundsen ............. 62/91.5 |
| 2,196,310 A | 4/1940 | Kalin ......................... 62/91.5 |
| 2,557,004 A | 6/1951 | Lepper ....................... 62/133 |
| 2,564,998 A | 8/1951 | Sayers ........................ 62/133 |
| 3,043,116 A | 7/1962 | Fuller ......................... 62/244 |
| 3,164,971 A | 1/1965 | Gentz ......................... 62/241 |
| 3,224,218 A | 12/1965 | New ........................... 62/239 |
| 3,248,897 A | 5/1966 | Stark .......................... 62/259 |
| 3,575,009 A | 4/1971 | Kooney ...................... 62/272 |
| 3,740,964 A * | 6/1973 | Herweg ...................... 62/262 |
| 4,841,742 A | 6/1989 | Biby ........................... 62/420 |
| 5,046,329 A | 9/1991 | Travis, III ................. 62/259.3 |
| 5,062,281 A | 11/1991 | Oliphant et al. ........... 62/457.1 |
| 5,146,757 A | 9/1992 | Dearing ........................ 62/61 |
| 5,159,819 A | 11/1992 | Wong ......................... 62/419 |
| 5,197,301 A | 3/1993 | Holcomb ................... 62/457.1 |
| 5,762,129 A | 6/1998 | Elliott ........................ 165/48.1 |
| 5,953,933 A | 9/1999 | Cheng ......................... 62/425 |
| 6,119,477 A | 9/2000 | Chan ........................... 62/406 |
| 6,170,282 B1 | 1/2001 | Eddins ...................... 62/259.3 |
| 6,227,004 B1 | 5/2001 | Gerstein ...................... 62/421 |
| 6,401,483 B1 | 6/2002 | Kopp .......................... 62/420 |
| 6,427,476 B1 | 8/2002 | Eddins ...................... 62/457.2 |

* cited by examiner

*Primary Examiner*—Melvin Joness
(74) *Attorney, Agent, or Firm*—Ellis & Venable, P.C.; Lance Venable

(57) ABSTRACT

An apparatus and method for cooling air that utilizes a removable reservoir that may be filled with a consumable beverage or other cooled liquid or solid material. The bottom of the reservoir is made of a thermally conductive material that is placed within an air duct within a base unit that has a battery powered fan capable of drawing in warm air from outside of the base unit and cooling it by passing it over the thermally conductive material in a turbulent fashion and expelling it back into the surrounding environment. An expandable hose may also be included to direct the airflow in a desired direction or location.

44 Claims, 8 Drawing Sheets

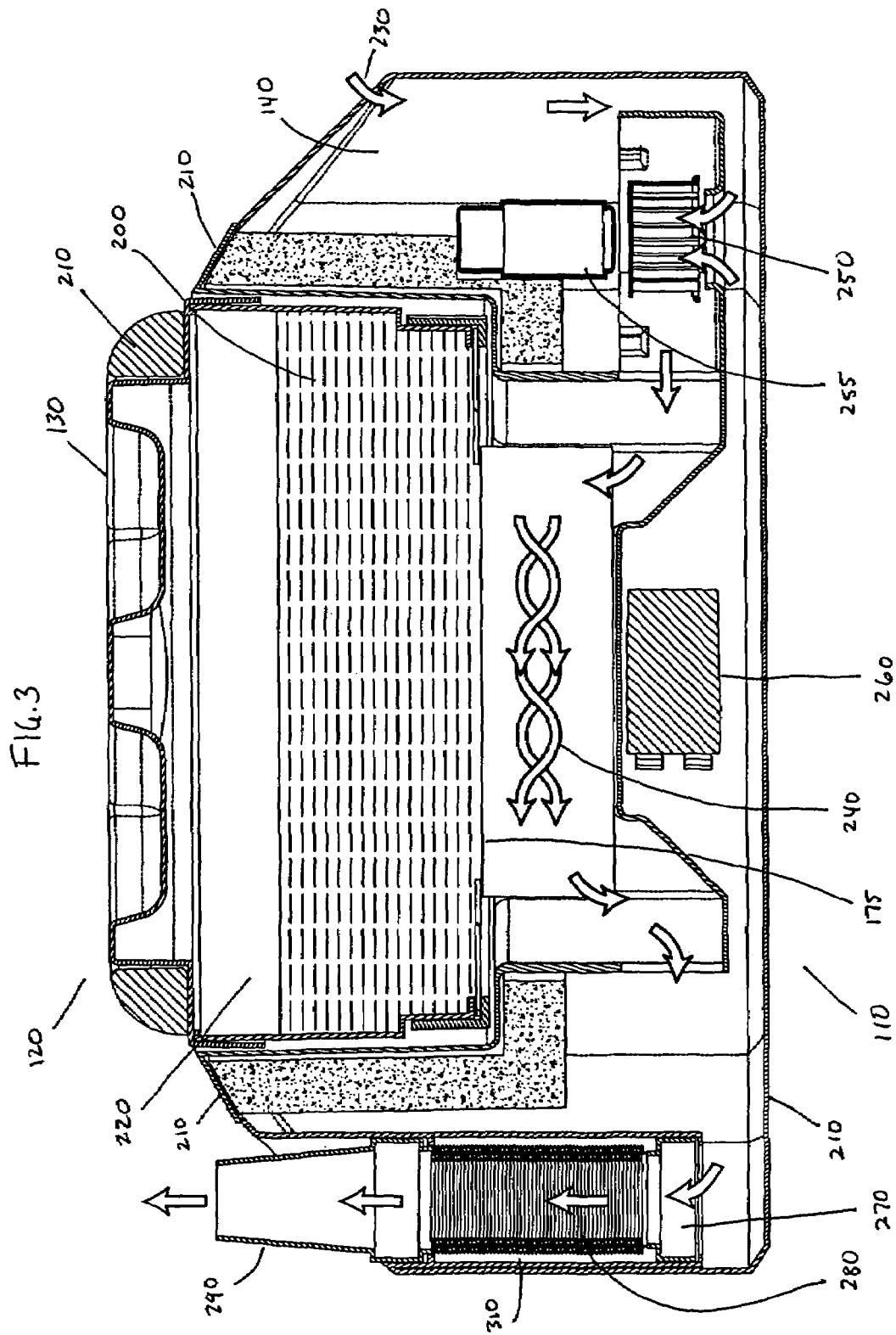

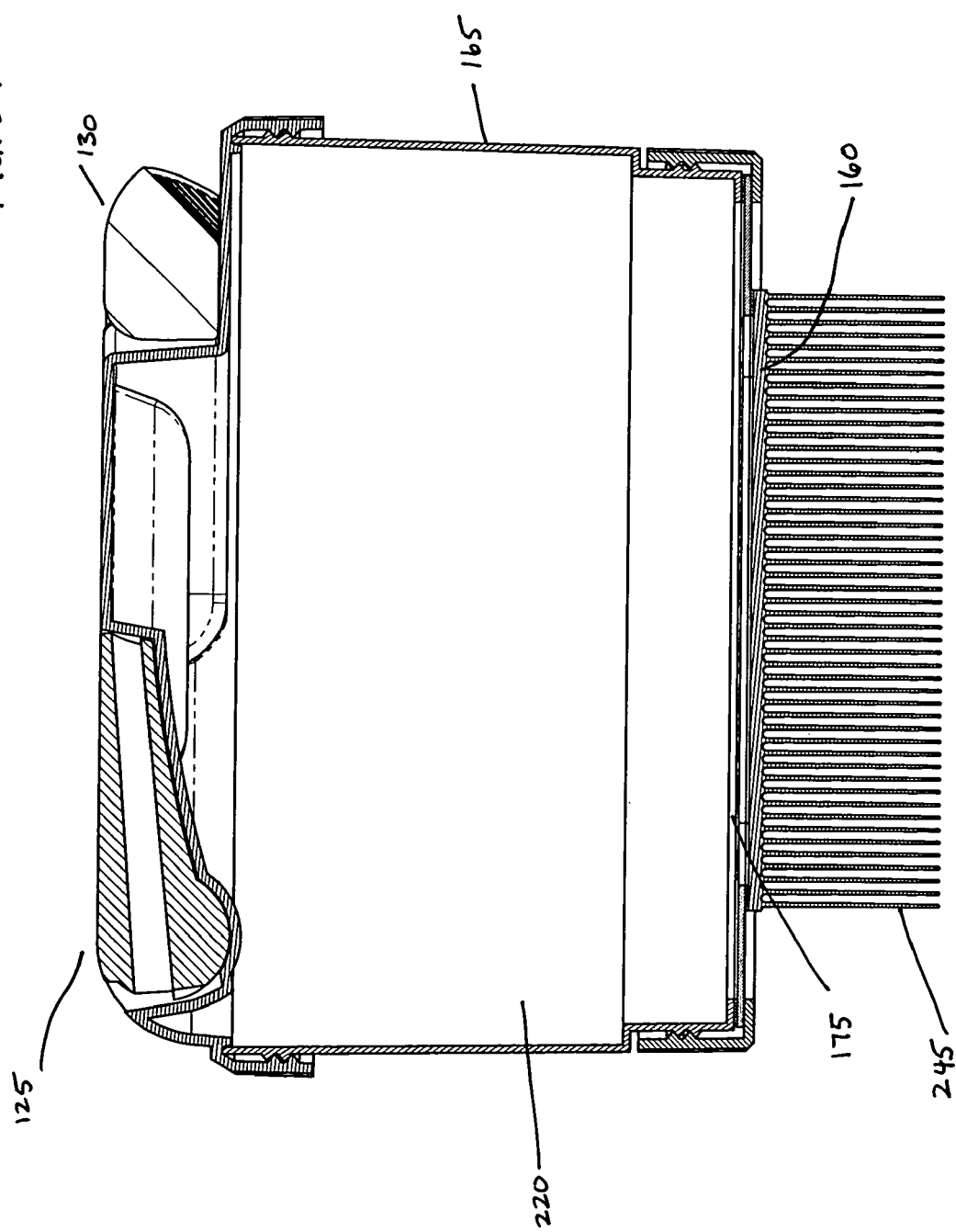

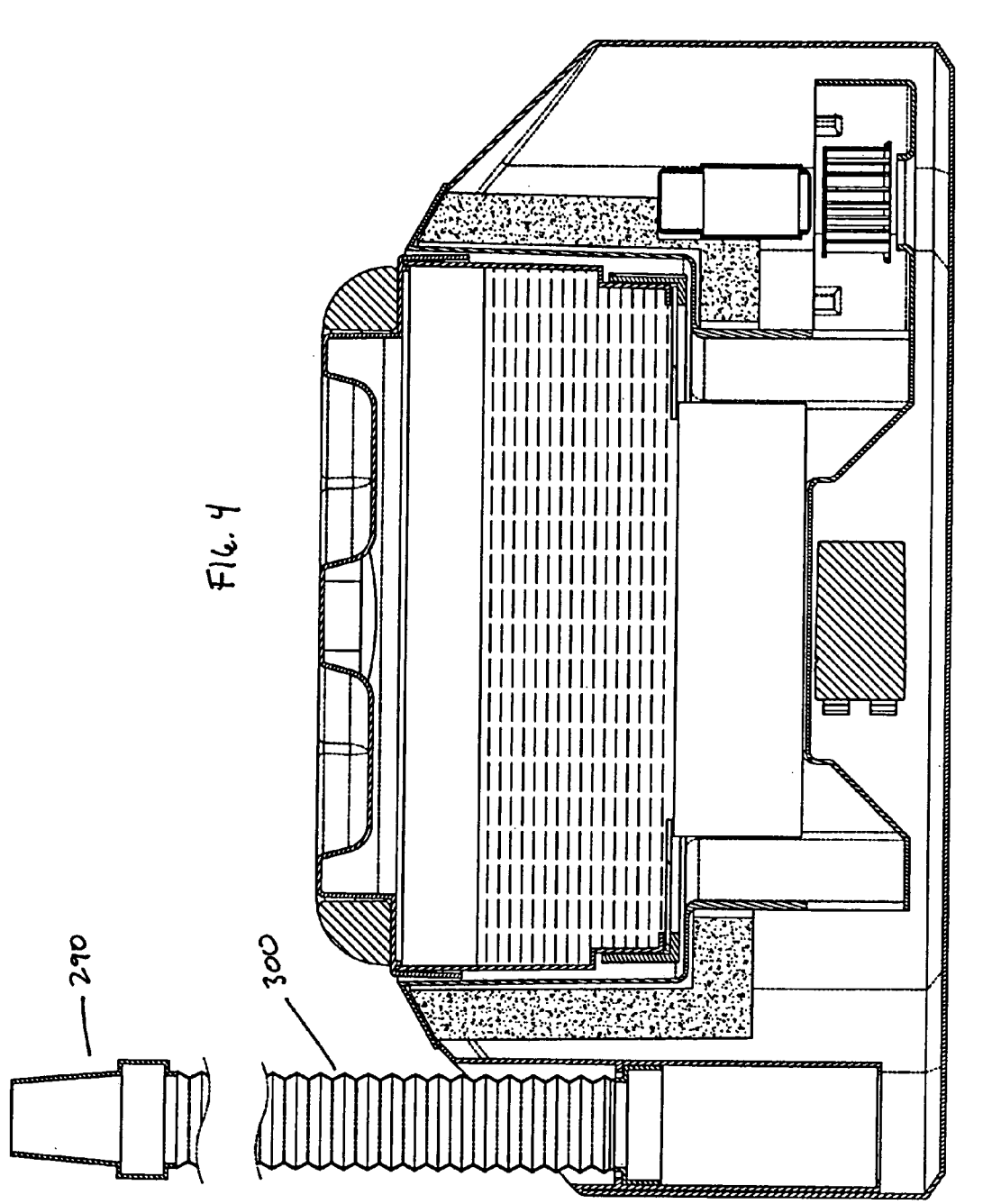

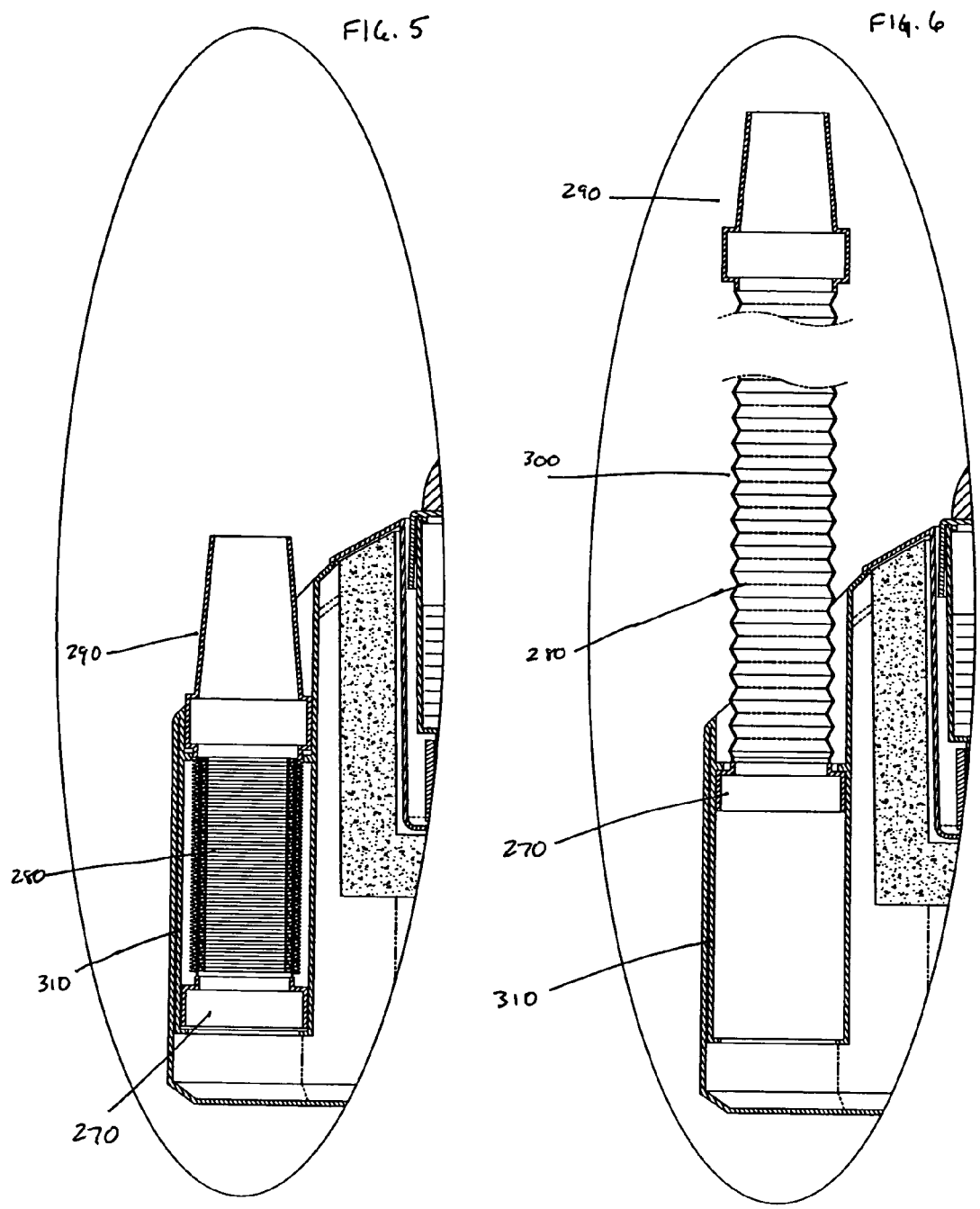

PORTABLE AIR CONDITIONER AND LIQUID CONTAINER

FIELD OF THE INVENTION

The present invention relates generally to portable air conditioning units that cool the surrounding air by ingesting the surrounding air and cooling it by fanning the air across a surface area that is in direct contact with liquid that is much cooler than the surrounding air so that the surface area temperature approaches that of the liquid. The unit also functions as a liquid storage container that may be used to store drinking water or other consumable beverages.

BACKGROUND OF THE INVENTION

Air conditioning units are very expensive, bulky, contain elements that are potentially harmful to the environment, and often require an AC external power source to operate. On warm days when it is difficult for an individual to maintain comfort due to the heat, it is often desirable to remain in an air-conditioned environment. This is very difficult to do when shelter is unavailable and the individual is directly exposed to the elements for an extended period of time, such as when working outdoors or attending an outdoor sporting event. Even in sheltered environments, there are many occasions when it is desirable to cool the surrounding environment as rapidly as possible such as when entering an automobile that has been exposed to the sun for a long period of time.

The present invention makes use of a portable apparatus that includes a reservoir for cooled liquid or ice. The reservoir is insulated with the exception of its bottom surface, which doubles not only as the bottom area of the reservoir, but also as the top to a heat sink that provides the area below the reservoir which acts as an air duct. The heat exchange system is substantially hollow but may also contain a series of fins that are in contact with the reservoir. The heat exchange system is designed to maximize the exposure of the air to the exposed surface area of the reservoir since the only air that is cooled is the air that directly comes in contact with the exposed surface of the reservoir. Generally, the heat exchange system should be located on the bottom of the unit so the heat transfer between the outside air and the bottom surface area of the reservoir may occur even when there are very low levels of cooled liquid in the reservoir. This would take advantage of the principle that the coldest liquid will always remain at the bottom of the container while in a given environment thus making an even more efficient cooling system.

When the reservoir is filled with cold liquid or ice, the exposed surface area of the reservoir becomes cooled to the temperature of the reservoir's contents. The heat exchange system is connected on one side by an air intake chamber and by an air exhaust chamber on the other. Warm air is drawn into the intake chamber from a battery-powered variable-speed motorized fan that creates a vacuum. The fan then pushes the warm air through the heat exchange system and is dehumidified and cooled by coming into direct contact with the exposed surface area of the reservoir and fins that extrude perpendicularly from the bottom surface of the reservoir within the heat exchange system. The fins provide resistance and vary the direction of the air, creating turbulence. Also, coolness from the exposed surface area is transferred down through the fins providing additional cooled surface area, which contacts and further cools the air. The turbulence greatly enhances the thermal conductive capacity of the system so that the heat transfer can occur at a highly efficient rate and maximizes the time that the temperature of the exposed surface of the reservoir remains cold. The cooled air is then propelled into the exhaust chamber where it is thrust into the external environment and may be directed at an individual or used to generally cool a surrounding area.

Over a period of time while cold fluid comes in contact with the surface of the heat exchanger that is exposed to the interior of the reservoir or container, a narrow region next to the surface of the heat exchanger exists where the velocity of the fluid is zero and rapidly changes to a finite number as the distance from the surface increases. This is known as the boundary layer. The fluid's velocity is zero due to a variety of factors ranging from molecular attraction to surface tension to friction. When a boundary layer forms, it may prevent the surface area of the fins from efficient thermal conductivity between the inner reservoir to the surface area of the is fins. This lack of conduction is due to the layer of insulation the boundary layer creates from the fluid directly adjacent to the exposed surface of the heat exchanger.

The reservoir may also include additional features such as a pour spout so that the liquid inside the reservoir may be consumed. The reservoir may also be removed from the unit so that its contents may be stored in a refrigerated environment. This allows multiple reservoirs to be used in succession thereby increasing the amount of time that cool air may be generated. Another feature of the apparatus is that the airflow may be directed by means of an extendable hose, which is embedded within the exhaust chamber of the unit. The entire external surface of the unit should be heavily insulated in order to prevent unwanted heat from coming into contact with the reservoir's contents.

DISCUSSION OF THE PRIOR ART

The use of air conditioners is known in the prior art. More specifically, air conditioners that cool the surrounding air that exchange heat while passing outside air over cooled surfaces is discussed in the prior art. Other similar portable air conditioning devices are disclosed in U.S. Pat. Nos. 6,427,746; 6,227,004; 6,119,477; 5,953,933; 5,062,281; 5,046,329; and 4,841,742.

While these devices aim to function as air conditioners, and while each invention disclosed in the respective patents may disclose a feature of the present invention, none of the above-listed patents disclose the combination of features in the present invention either individually or in combination with each other in such a way that it would have been obvious to do so at the time the present invention was conceived.

In addition, there is a need in the art for a device which can function as both a portable air conditioner and a beverage container that maximizes the time that ambient air may be cooled within the small confines of a portable unit to a temperature much lower than the ambient air temperature and accomplishes these tasks utilizing a removable cooling source in combination with a directed application of the cooled air. A device of this type is disclosed by the present invention.

SUMMARY OF THE INVENTION

Broadly, it is an object of the present invention to provide a portable air conditioner that includes a separate container for storing cool materials such as cold water or ice or containers of items to be cooled, which may also be consumed by the user.

It is a further object of the present invention for the container to be composed of a thermally conductive material for storing cold liquid or ice and that such cold liquid can be safely consumed.

It is a further object of the present invention to provide a portable air conditioner that utilizes a motorized fan to ingest outside air and cool it by passing the air over a substantial portion of the thermally-conductive, non-toxic material before propelling the cooled-air back into the environment.

It is a further object of the present invention to minimize the temperature of the cooled air by passing the air through a turbulent environment.

It is a further object of the present invention to locate the thermally-conductive material on the bottom of the container.

It is a further object of the present invention to maximize the efficiency of heat exchange by minimizing the effects of the formation of a boundary layer on the thermally-conductive material.

It is a further object of the present invention to provide a removable container that may be removed from a base unit and easily and thoroughly sanitized.

It is a further object of the present invention to provide an adjustable and expandable hose that may be used to direct the flow of cooled air where desired.

It is a further object of the present invention to provide a pour spout that enables the contents of the container to be conveniently consumed.

It is a further object of the present invention to provide a method of cooling outside air that efficiently ingests outside air, and cools it by passing the outside air in a turbulent manner over and through a cooled surface area of a container and expelling the cooled air into the environment.

The description of the invention which follows, together with the accompanying drawings should not be construed as limiting the invention to the example shown and described, because those skilled in the art to which this invention appertains will be able to devise other forms thereof within the ambit of the appended claims.

BRIEF DESCRIPTION OF THE DRAWINGS

FIG. 3 is a front view in cross section of the apparatus demonstrating the direction of air intake, flow and expulsion from the apparatus;

FIG. 3A is a side view in cross section of the removable reservoir;

FIG. 4 is a front view in cross section of the apparatus with the expandable hose fully extended;

FIG. 5 is a detailed view of the expandable hose fully retracted;

FIG. 6 is a detailed view of the expandable hose fully extended.

DESCRIPTION OF THE PREFERRED EMBODIMENT

Figure 1:
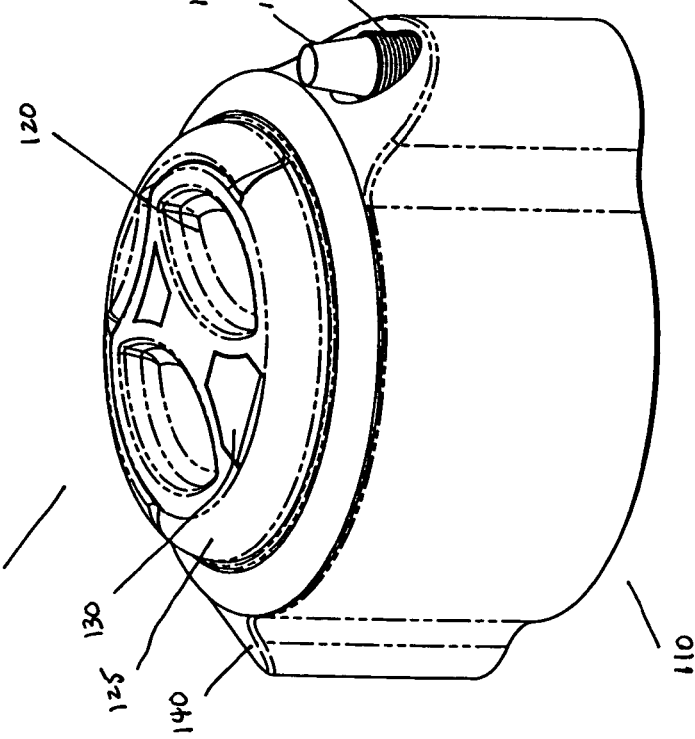
FIG. 1 is a perspective view of the apparatus.

By way of one example of many to serve as background in understanding the present invention, FIG. 1 shows a portable air conditioner 100 that includes a base unit 110 and a removable beverage container 120. The container 120 is intended for storing a liquid or solid whose temperature is substantially colder than the air temperature outside of the air conditioner 100. A spout 130 provides access to the contents of the container 120 which may include a chilled beverage such as ice water. A handle 125 is included for easy portability. The container 120 is secured within the base unit 110 as shown in FIG. 1. The external portion of the base unit 110 includes an air intake valve 140 that takes in air from outside of the air conditioner 100 for processing within the unit 110 and is expelled out an air nozzle 155. The air nozzle 155 is connected to an expandable hose 150 such that expelled air from the nozzle 155 can be directed to a given location.

Figure 2:
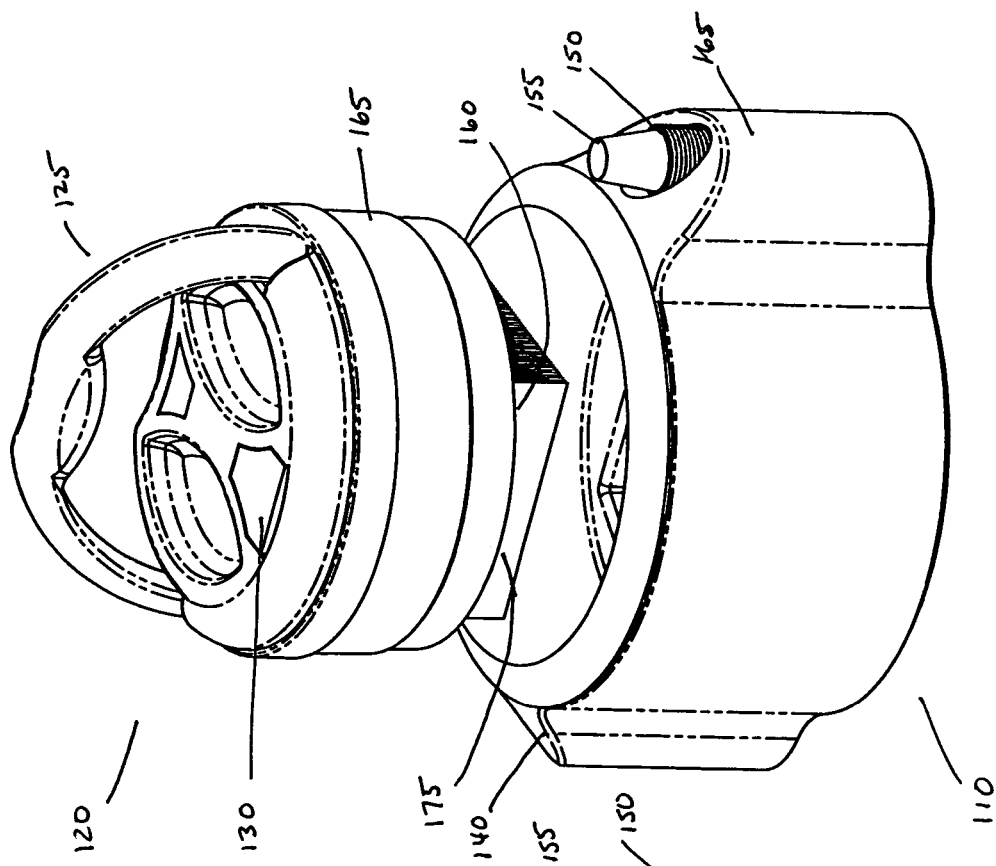
FIG. 2 is a perspective view of an apparatus showing the removable container separate from the base of the apparatus.

In FIG. 2, the container 120 is shown removed from the base unit 100 with its handle 125 fully extended. The container 120 is comprised of a combination of highly thermal-conductive, non-toxic material such as aluminum that forms the bottom of the container 160 and a non-toxic material such as plastic that forms the sides of the structure 165. The lower portion 160 is exposed and comes into direct contact with the base unit 110 when secured. It is a primary goal for the lower portion 160 to obtain, and subsequently retain, the same temperature of the liquid or solid inside of the container 120 for as long as possible, and to remain in constant contact with the surface area 175 thereby cooling the surface area 175 to the temperature of the liquid 200 inside the reservoir 220. The surface area 175 of the lower portion 160 is used to cool any air that comes into contact with the surface area 175. Because the container 120 is removable, it is possible to fill the container 120 with a given liquid and store it in a refrigerated environment for use at a later time. The container 120 may also be filled with liquid and stored in a freezer so that the entire contents of the container 120 becomes frozen. A typical size of the container 120 can hold between one half and two gallons of liquid.

FIG. 3 shows the cross-sectional view of the air conditioner 100 with the container 120 secured within the base unit 110. As shown, a cooled liquid 200 is filled approximately ¾ to the top of a reservoir 220. The container 120 is surrounded on all sides by insulation 210 in order to maximize the time that the cooled liquid 200 retains its original temperature.

Air from outside of the air conditioner 100 is drawn into the air intake chamber 140 by means of a high-speed electric motor 255 that may be powered by a battery 260. An alternative embodiment of the invention may include an AC/DC power source. However, an AC/DC power source is understood to limit the portability of the air conditioner 100. The motor 255 turns a rotating fan 250 in a manner that creates an airflow 230 that pulls in warmer air from outside of the air conditioner 100. It is desirable to minimize the volume of the air intake chamber 140 while maximizing the amount of airflow 230. The airflow 230 follows the general direction as shown with the arrows through from the air intake chamber 140 through the fan 250 and into the central chamber 240. It is desirable to maximize the volume of the chamber 240 while creating turbulence in the air through the use of fins 245 (FIG. 3A). The fins 245 would be in direct contact with the lower surface area 175 and would create an environment such that the air molecules would maximize the time that they come in contact with the conductive surface area 175 thereby allowing the temperature of the airflow 230 to be minimized so that it may approach the temperature of the liquid 200 inside of the reservoir 220. Because the chamber 240 is in direct contact with the lower portion 160 (FIG. 3A) of the container 120, the lower portion 160 is able to continually cool the surface area 175 for as long as there is even a minimal amount of liquid 200 remaining in the reservoir 220.

As shown in FIG. 3A, one embodiment of the removable container 120 demonstrates how the cooled surface area 160 may be arranged to maximize the length of time that the airflow 230 may come in direct contact with the cooled surface area 160. As can readily be seen, the lower surface area 175 of the reservoir 220 is configured with a series of vertically arranged fins 245 that protrude perpendicular to the lower surface 175. The fins 245 are comprised of an efficient thermally-conductive material such as aluminum or copper. It is understood that the fins 245 are not required to be positioned exactly perpendicular to the lower surface 175. As stated above, because the fins 245 are directly connected to the lower surface 175 of the reservoir 220, the temperature of the surface areas of all fins 245 will drop to the temperature of the lower surface 175 which would be the temperature of the contents 200 of the reservoir 220. As the airflow 230 passes between the fins 245, the airflow 230 will have a maximum amount of cooled surface area in which it will come in contact thereby minimizing the temperature of the airflow 230. The airflow 230 will also bounce back and forth between each of the fins 245 thereby creating air turbulence 240 as shown in FIG. 3. In an alternative embodiment, the fins 245 can be arranged in a maze-like formation such that the airflow 230 would reverse its direction of travel several times thus creating more turbulence and still enabling the airflow 230 to maximize the surface area of the fins 245 that it contacts.

Figure 3B:
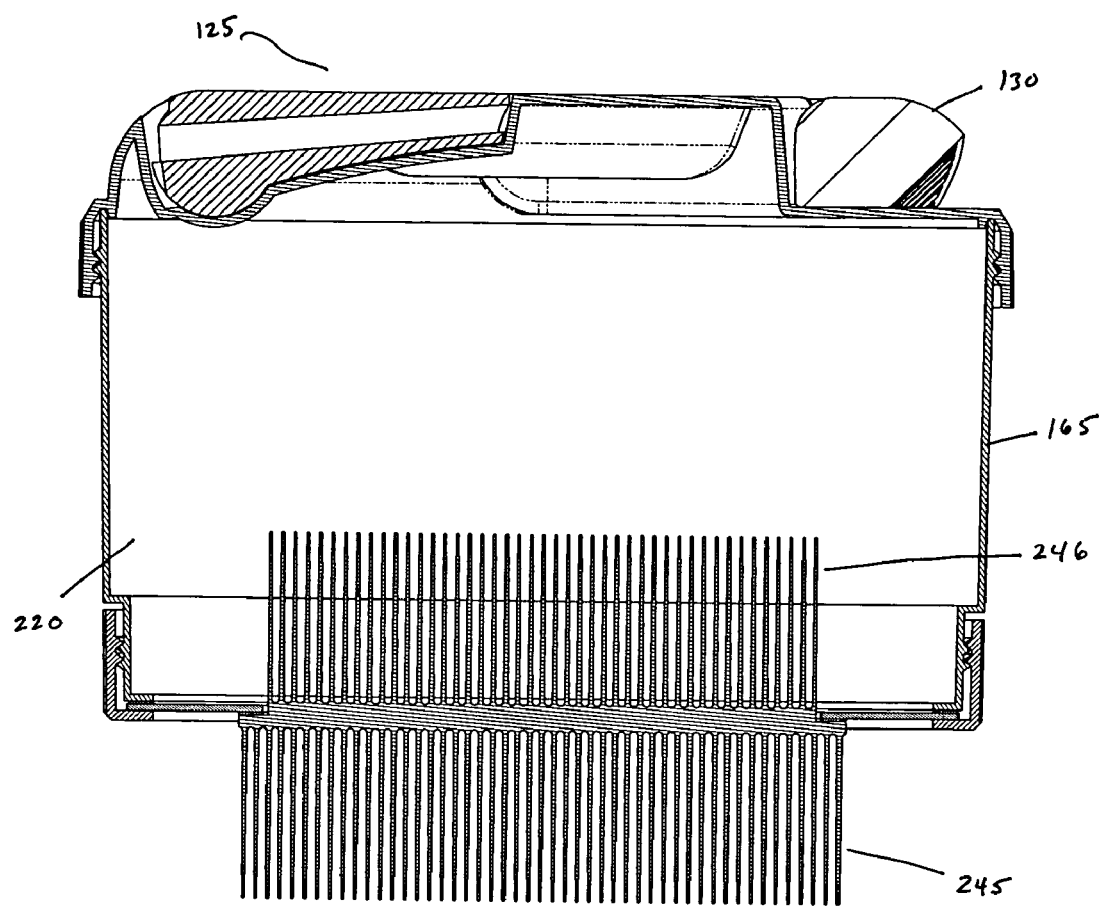
FIG. 3B is a front cross-sectional view of the reservoir with the thermally-conductive surface area extending inside of the reservoir.

Alternatively, in FIG. 3B the fins 245 may form one continuous thermally conductive surface with internal fins 246 that extend within the reservoir 220. The increased surface area of the fins increases the thermal conductivity activity of the entire content of the container and reduces the thermal conductive resistance presented by the boundary layer. With the addition of the fins 246 that are directly connected to the fins 245 it was noticed that a substantial reduction, and in many cases, a complete elimination of the thermal conductive resistance would occur. As a result, a more efficient heat transfer may occur thereby maintaining the coldest possible temperature on the surface area of the fins 245 for the longest possible time.

Figure 3C:
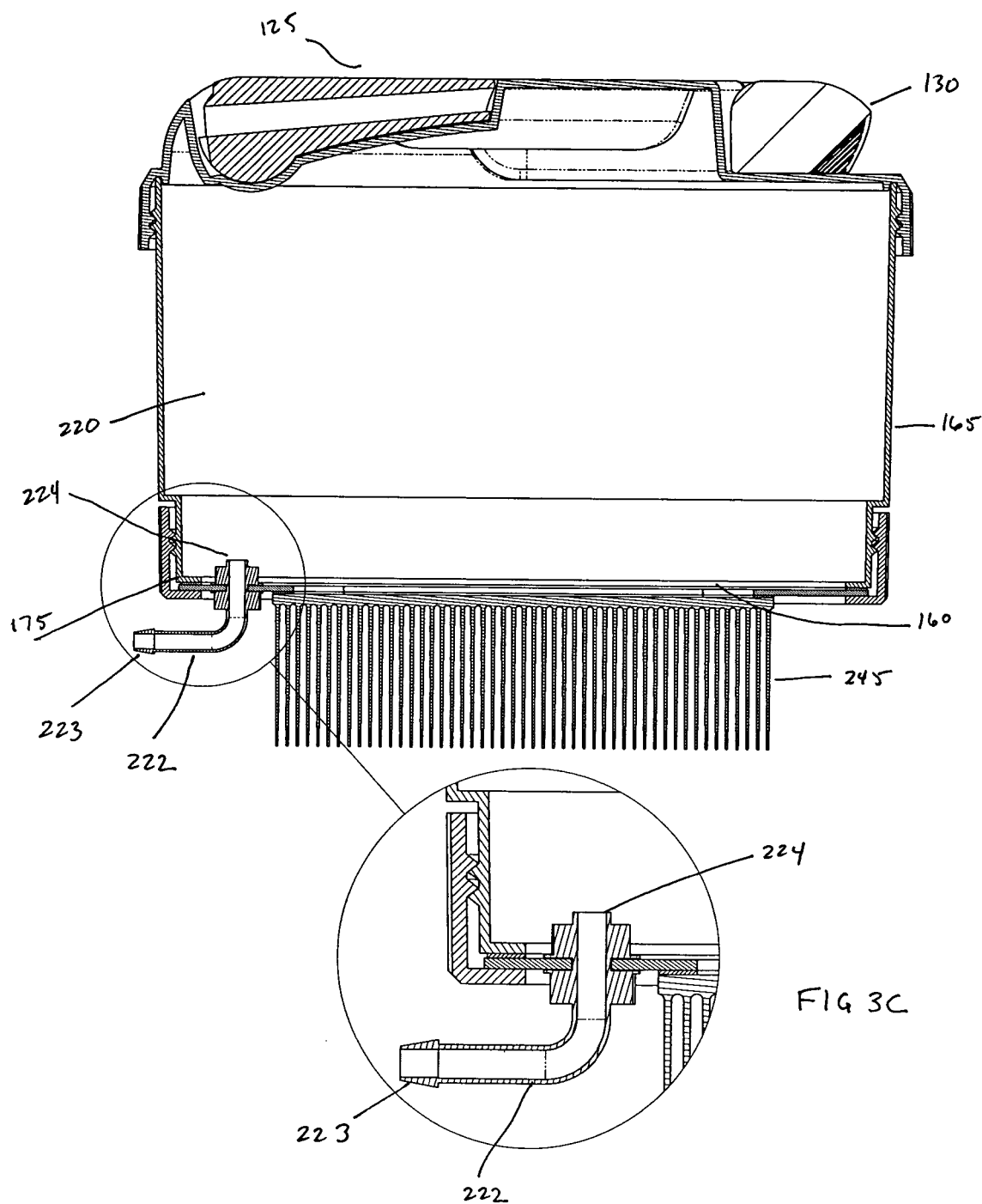
FIG. 3C is a front cross-sectional view of the reservoir with a drainage tube for removing excess liquid from the inside of the reservoir.

In an alternative embodiment that also serves to address the problem of boundary layer formation, FIG. 3C offers an alternative approach when the contents of the reservoir are intended to be completely frozen. A drainage pipe 222 is included at the lower surface 175. The pipe 222 has an opening 224 that extends within the reservoir 220 and a cap 223 on the external end of the pipe 222. When this embodiment is used with a reservoir 220 that contains frozen contents, the pipe 222 is used to drain excess liquid that may melt from the frozen contents over time. Through experimentation, it was learned that as the frozen material in the container 220 melted and the liquid formed was ample enough, an insulating boundary layer would form on the lower surface area 160. However, when excess water was drained away from the reservoir 220 and specifically the area of thermal conductivity or the lower surface area 160, the boundary layer would be less likely to form on the lower surface area 160, and many times would not form at all.

Figure 3D:
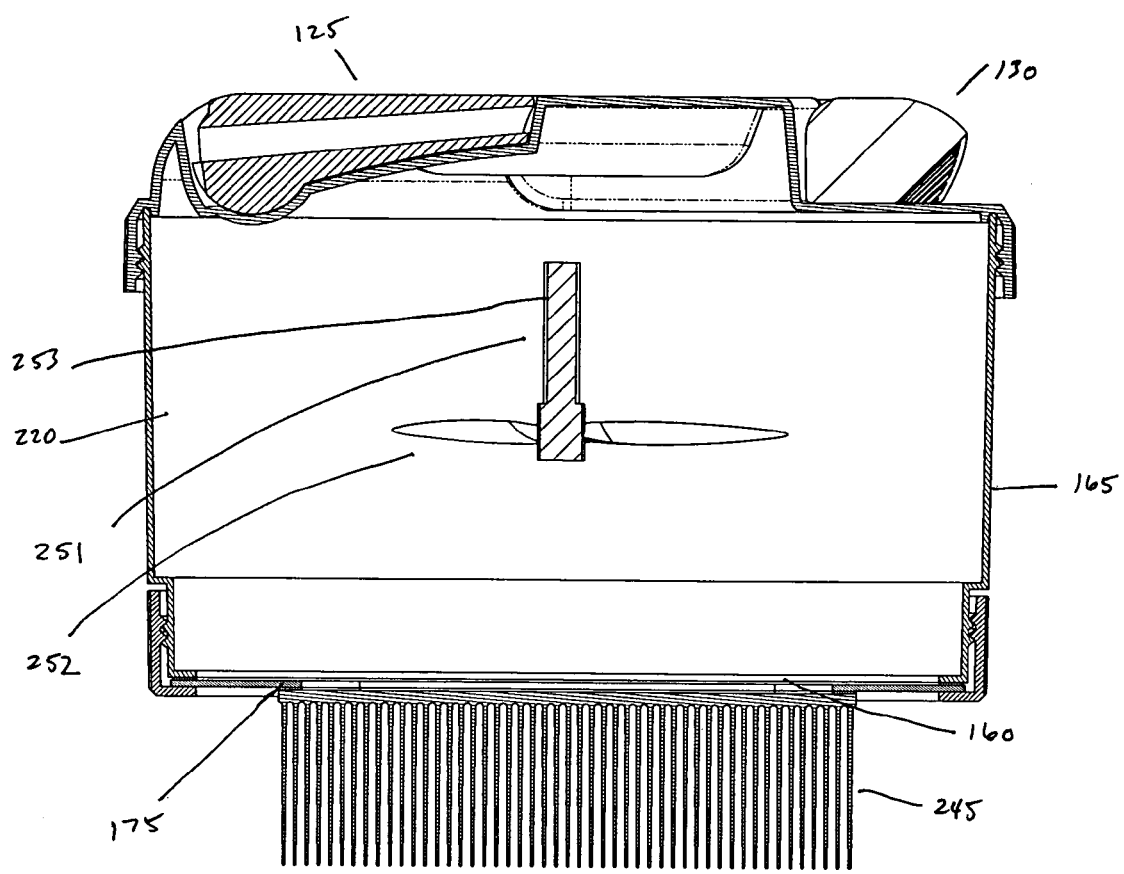
FIG. 3D is a front cross-sectional view of the reservoir with an agitator for mixing the contents inside of the reservoir.

In another embodiment as shown in FIG. 3D, an agitator 251 is included within the reservoir 220. The agitator includes a set of blades 252 that are fixed perpendicular to a rod 253 such that when the rod 253 is rotated in a circular fashion, the blades 252 will mix the contents of the reservoir 220. This may be necessary when some of the contents of the reservoir 220 become stagnant and the fluid is allowed to form a boundary layer on the lower surface area 160. By mixing the contents of the reservoir 220, it will allow for the lower surface area 175 to maintain the temperature of the contents of the reservoir 220 for the longest period of time. It is understood that the agitator 251 may operate either manually by means of an external crank, or electrically by means of a motor. The agitation could also be created by the introduction of a pump that introduces outside air 100 or the recycled contents of the container 220 into the stagnant contents of the container 220 to disrupt the plaid nature of the fluid and the boundary layer. This embodiment may also be combined with the embodiments in FIG. 3B or 3C.

Referring back to FIG. 3, upon exiting the chamber 240, the airflow is now cooled substantially below the ambient air temperature and proceeds toward the exhaust chamber 290. In the preferred embodiment, the airflow 230 travels through an expandable hose 280 that may be extended like an accordion 300 as shown in FIG. 4 to direct the airflow 230 in whatever direction and point desired by an individual.

FIGS. 5 and 6 show more detailed drawings of the expandable hose 280 that is connected to the exhaust valve 290. The hose 280 is attached on one end to a catch 270 and on the other end by the exhaust valve 290. As shown in FIG. 5 with the hose 280 in its fully retracted position, the combination of these three elements sits within an insulated exhaust guide 310 such that when the hose 280 is extended fully as shown in FIG. 6, the catch 270 may move upward within the guide 310 until it reaches the top of the guide 310 thus allowing the valve 290 to be directed to whatever location the user desires.

While the inventive apparatus, as well as a method of cooling ambient air as described and claimed herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

Although the invention has been described in detail with reference to one or more particular preferred embodiments, persons possessing ordinary skill in the art to which this invention pertains will appreciate that various modifications and enhancements may be made without departing from the spirit and scope of the claims that follow.

What is claimed is:

1. A portable air conditioner for cooling an air temperature outside of the portable air conditioner comprising:

a. A reservoir;

i. said reservoir further comprising a sealed container for storing chilled matter, said matter having a temperature that is lower than the air temperature outside of the portable air conditioner;

said reservoir further comprising a top surface area, a bottom surface area, and an outer surface area said bottom surface area further comprising a thermally conductive material;

b. A power source;

c. A motorized airflow generator coupled to said power source;

d. An air duct; said air duct further comprising:
  i. an air intake chamber;
  ii. an exhaust chamber;
  iii. a central chamber;
    1. said central chamber further comprising a top area;
    2. said central chamber located between said air intake chamber and said exhaust chamber such that the top area of said central chamber includes the bottom surface area of said reservoir;
e. said motorized airflow generator coupled to said air duct;
f. said motorized airflow generator such that when said airflow generator receives power from said power source, the airflow generator generates an airflow that originates from outside of said portable air conditioner and flows into said air intake chamber;
g. said airflow having a temperature and continuing in motion such that said airflow may come in contact with said bottom surface area of said reservoir such that if said bottom surface area has a temperature that is less than the temperature of the airflow then the bottom surface area reduces the temperature of said airflow;
h. said airflow continuing in motion such that said airflow enters said exhaust chamber and is expelled outside of said portable air conditioner.

2. The portable air conditioner of claim 1 wherein said top surface area of said reservoir is covered by a first insulating material.

3. The portable air conditioner of claim 1 wherein said air conditioner is covered by a second insulating material.

4. The portable air conditioner of claim 1 wherein said bottom surface area of said reservoir further comprises at least one fin.

5. The portable air conditioner of claim 4 wherein said reservoir further comprises a pour spout on the top surface of said reservoir such that said matter within said reservoir may be consumed through said pour spout.

6. The portable air conditioner of claim 4 wherein said at least one fin is arranged in such a way that said airflow deflects off of said at least one fin in many directions before said airflow is expelled out of said exhaust chamber.

7. The portable air conditioner of claim 1 wherein said exhaust chamber further comprises a top, a bottom and a hose for directing said airflow in a particular location.

8. The hose of claim 7 wherein said hose further comprises:
  a. an exhaust valve;
  b. an expandable section coupled to said exhaust valve;
  c. a catch coupled to said expandable section wherein the catch of said hose may move between the top and bottom of said exhaust chamber such that when the catch is moved to the top of said exhaust chamber, the expandable section may be expanded to a maximum length.

9. The portable air conditioner of claim 1 further comprising an agitator; said agitator coupled to said reservoir such that said agitator may agitate the matter stored in said reservoir.

10. A portable air conditioner for cooling an air temperature outside of the portable air conditioner comprising:
  a. A reservoir;
    i. said reservoir further comprising a sealed container for storing chilled matter, said matter having a temperature that is lower than the air temperature outside of the portable air conditioner;
    said reservoir further comprising a top surface area, a bottom surface area, and an outer surface area said bottom surface area further comprising a thermally conductive material;
  b. A power source;
  c. A motorized airflow generator coupled to said power source;
  d. An air duct; said air duct further comprising:
    i. an air intake chamber;
    ii. an exhaust chamber;
    iii. a recessed area for receiving the bottom surface area of said reservoir;
  e. said motorized airflow generator coupled to said air duct;
  f. said motorized airflow generator coupled to said power source such that when said airflow generator receives power from said power source, the airflow generator generates an airflow that originates from outside of said portable air conditioner and flows into said air intake chamber;
  g. said airflow having a temperature and continuing in motion such that said airflow may come in contact with said bottom surface area of said reservoir such that if said bottom surface area has a temperature that is less than the temperature of the airflow then the bottom surface area reduces the temperature of said airflow;
  h. said airflow continuing in motion such that said airflow enters said exhaust chamber and is expelled outside of said portable air conditioner.

11. The portable air conditioner of claim 10 wherein said reservoir may be removed in its entirety from said portable air conditioner.

12. The portable air conditioner of claim 11 wherein said bottom surface area of said reservoir further comprises at least one fin such that said fin is aligned perpendicular to said bottom surface area of said reservoir.

13. The portable air conditioner of claim 10 wherein said top surface of said reservoir is covered by a first insulating material.

14. The portable air conditioner of claim 10 wherein said air conditioner is covered by a second insulating material.

15. The portable air conditioner of claim 10 wherein said reservoir further comprises a pour spout on the top surface of said reservoir such that said matter within said reservoir may be consumed through said pour spout.

16. The portable air conditioner of claim 12 wherein said at least one fin is arranged in such a way that said airflow is deflected of said at least one fin in many directions before said airflow is expelled out of said portable air conditioner.

17. The portable air conditioner of claim 10 wherein said exhaust chamber further comprises a top, a bottom and a hose for directing said airflow in a particular location.

18. The hose of claim 17 wherein said hose further comprises:
  a. an exhaust valve;
  b. an expandable section coupled to said exhaust valve;
  c. a catch coupled to said expandable section wherein the catch of said hose may move between the top and bottom of said exhaust chamber such that when the catch is moved to the top of said exhaust chamber, the expandable section may be expanded to a maximum length.

19. The portable air conditioner of claim 10 further comprising an agitator; said agitator coupled to said reservoir such that said agitator may agitate the matter stored in said reservoir.

20. A method of cooling the temperature of air comprising the steps of:
 a. forming a reservoir wherein said reservoir further comprises:
  i. an outer surface area located between a top surface area and a bottom surface area said bottom surface area composed of a thermally conductive material;
 b. inserting a substance into said reservoir so that the substance is in direct contact with the bottom surface area of said reservoir;
 c. cooling said substance to a temperature lower than said air temperature such that the temperature of the substance is transferred to said bottom surface area thereby cooling said bottom surface area to the temperature of said substance;
 d. Forming an air duct wherein the steps of forming an air duct further comprise:
  i. Forming an air intake chamber;
  ii. Forming an exhaust chamber;
  iii. Forming a central chamber wherein the step of forming a central chamber further comprises:
   1. forming a top area such that the top area of said central chamber includes the bottom surface area of said reservoir and coupling said central chamber between said air intake chamber and said exhaust chamber;
 e. securing a motorized airflow generator to said air duct;
 f. coupling a power source to said motorized airflow generator;
 g. turning on said power source such that said motorized airflow generator begins to form a moving airflow that has a temperature and draws said airflow into said air intake chamber;
 h. passing said air over said bottom surface of said reservoir wherein said bottom surface area reduces the temperature of said airflow;
 i. moving said airflow to said exhaust chamber;
 j. expelling said airflow outside of said exhaust chamber.

21. The method of claim 20 further comprising the step of forming at least one fin on said bottom surface area such that when the airflow passes over said bottom surface area, said airflow becomes may be deflected and move in multiple directions before said airflow is moved to said exhaust chamber.

22. The method of claim 21 further comprising the step of forming at least one fin on said bottom surface area such that said fin protrudes perpendicularly into said reservoir.

23. The method of claim 20 further comprising the step of inserting an agitator within said reservoir such that said agitator may be activated so that it serves to agitate the substance within said reservoir.

24. The method of claim 20 further comprising the steps of
 a. inserting a drainage pipe said drainage pipe having a top and a bottom such that the top of the drainage pipe is secured to the bottom surface area of the reservoir and the bottom of the drainage pipe is located on the outside of the air conditioner;
 b. removing a portion of the substance from the reservoir by draining said substance from the top of the drainage pipe to the bottom of the drainage pipe such that said substance exits the bottom of the drainage pipe.

25. The method of claim 20 further comprising the step of insulating said reservoir on the top surface area.

26. The method of claim 20 further comprising the step of insulating said air conditioner.

27. The method of claim 20 further comprising the steps of securing an agitator to said reservoir such that said agitator may agitate the matter stored in said reservoir.

28. A portable air conditioner for cooling an air temperature outside of the portable air conditioner comprising:
 a. A reservoir;
  i. said reservoir further comprising a sealed container for storing matter, said matter having a temperature that is lower than the air temperature outside of the portable air conditioner; said reservoir further comprising a top surface area, a bottom surface area, and an outer surface area, said bottom surface area composed of a thermally conductive material;
 b. A power source;
 c. A motorized airflow generator coupled to said power source;
 d. An air duct; said air duct further comprising:
  i. an air intake chamber;
  ii. an exhaust chamber;
  iii. a central chamber;
   1. said central chamber further comprising a top area;
   2. said central chamber located between said air intake chamber and said exhaust chamber such that the top area of said central chamber includes the bottom surface area of said reservoir;
   3. said bottom surface area further comprising:
    a. at least one first fin;
    b. at least one second fin;
  iv. said at least one first fin protruding outside of said reservoir such that said at least one first fin contacts said air duct;
  v. said at least one second fin protruding inside of said reservoir such that said at least one second fin may directly contact said matter;
 e. said motorized airflow generator coupled to said air duct;
 f. said motorized airflow generator such that when said airflow generator receives power from said power source, the airflow generator generates an airflow that originates from outside of said portable air conditioner and flows into said air intake chamber;
 g. said airflow having a temperature and continuing in motion such that said airflow may come in contact with said bottom surface area of said reservoir such that if said bottom surface area has a temperature that is less than the temperature of the airflow then the bottom surface area reduces the temperature of said airflow;
 h. said airflow continuing in motion such that said airflow enters said exhaust chamber and is expelled outside of said portable air conditioner.

29. The portable air conditioner of claim 28 wherein said top surface area of said reservoir is covered by a first insulating material.

30. The portable air conditioner of claim 28 wherein said air conditioner is covered by a second insulating material.

31. The portable air conditioner of claim 28 wherein said reservoir further comprises a pour spout on the top surface of said reservoir such that said matter within said reservoir may be consumed through said pour spout.

32. The portable air conditioner of claim 28 wherein said at least one first fin is arranged in such a way that said airflow deflects off of said at least one first fin in many directions before said airflow is expelled out of said exhaust chamber.

33. The portable air conditioner of claim 28 wherein said exhaust chamber further comprises a top, a bottom and a hose for directing said airflow in a particular location.

34. The hose of claim 33 wherein said hose further comprises:
   a. an exhaust valve;
   b. an expandable section coupled to said exhaust valve;
   c. a catch coupled to said expandable section wherein the catch of said hose may move between the top and bottom of said exhaust chamber such that when the catch is moved to the top of said exhaust chamber, the expandable section may be expanded to a maximum length.

35. The portable air conditioner of claim 28 further comprising an agitator; said agitator coupled to said reservoir such that said agitator may agitate the matter stored in said reservoir.

36. A portable air conditioner for cooling an air temperature outside of the portable air conditioner comprising:
   a. A reservoir;
      i. said reservoir further comprising:
         1. a sealed container for storing matter, said matter having a temperature that is lower than the air temperature outside of the portable air conditioner; said reservoir further comprising:
            a. a top surface area,
            b. a bottom surface area said bottom surface area composed of a thermally conductive material, and
            c. an outer surface area,
         2. a drainage pipe;
            a. said drainage pipe further comprising:
               i. a bottom having a closed and an open position;
               ii. a top such that the top of said drainage pipe protrudes into said reservoir through the bottom surface of said reservoir so that when the bottom of said drainage pipe is in the open position, said drainage pipe may funnel a portion of the matter within said reservoir to a point outside of said reservoir from the top of said drainage pipe to the bottom of said drainage pipe;
   b. A power source;
   c. A motorized airflow generator coupled to said power source;
   d. An air duct; said air duct further comprising:
      i. an air intake chamber;
      ii. an exhaust chamber;
      iii. a central chamber;
         1. said central chamber further comprising a top area;
         2. said central chamber located between said air intake chamber and said exhaust chamber such that the top area of said central chamber includes the bottom surface area of said reservoir
   e. said motorized airflow generator coupled to said air duct;
   f. said motorized airflow generator such that when said airflow generator receives power from said power source, the airflow generator generates an airflow that originates from outside of said portable air conditioner and flows into said air intake chamber;
   g. said airflow having a temperature and continuing in motion such that said airflow may come in contact with said bottom surface area of said reservoir such that if said bottom surface area has a temperature that is less than the temperature of the airflow then the bottom surface area reduces the temperature of said airflow;
   h. said airflow continuing in motion such that said airflow enters said exhaust chamber and is expelled outside of said portable air conditioner.

37. The portable air conditioner of claim 36 wherein said top surface areas of said reservoir is covered by a first insulating material.

38. The portable air conditioner of claim 36 wherein said air conditioner is covered by a second insulating material.

39. The portable air conditioner of claim 36 wherein said bottom surface area of said reservoir further comprises at least one fin.

40. The portable air conditioner of claim 36 wherein said reservoir further comprises a pour spout on the top surface of said reservoir such that said matter within said reservoir may be consumed through said pour spout.

41. The portable air conditioner of claim 39 wherein said at least one fin is arranged in such a way that said airflow deflects off of said at least one fin in many directions before said airflow is expelled out of said exhaust chamber.

42. The portable air conditioner of claim 36 wherein said exhaust chamber further comprises a top, a bottom and a hose for directing said airflow in a particular location.

43. The hose of claim 42 wherein said hose further comprises:
   a. an exhaust valve;
   b. an expandable section coupled to said exhaust valve;
   c. a catch coupled to said expandable section wherein the catch of said hose may move between the top and bottom of said exhaust chamber such that when the catch is moved to the top of said exhaust chamber, the expandable section may be expanded to a maximum length.

44. The portable air conditioner of claim 36 further comprising an agitator; said agitator coupled to said reservoir such that said agitator may agitate the matter stored in said reservoir.

* * * * *